US012699829B2

(12) United States Patent
C et al.

(10) Patent No.: US 12,699,829 B2
(45) Date of Patent: Aug. 4, 2026

(54) METHODS AND APPARATUS TO GENERATE CIRCUIT TIMING CONSTRAINT PREDICTIONS USING MACHINE LEARNING

(71) Applicant: Intel Corporation, Santa Clara, CA (US)

(72) Inventors: Lekshmi C, Bangalore (IN); Sourav Saha, Bangalore (IN); Anmol Khatri, Bangalore (IN); Raj Chetan Yadav, Vadodara (IN); Rakshit Bazaz, Bangalore (IN); Shivangi Gupta, Hosur (IN)

(73) Assignee: Intel Corporation, Santa Clara, CA (US)

( * ) Notice: Subject to any disclaimer, the term of this patent is extended or adjusted under 35 U.S.C. 154(b) by 22 days.

(21) Appl. No.: 17/984,053

(22) Filed: Nov. 9, 2022

(65) Prior Publication Data

US 2024/0078368 A1 Mar. 7, 2024

Related U.S. Application Data

(60) Provisional application No. 63/403,858, filed on Sep. 5, 2022.

(51) Int. Cl.
*G06F 30/3312* (2020.01)
*G06F 119/08* (2020.01)

(52) U.S. Cl.
CPC ...... *G06F 30/3312* (2020.01); *G06F 2119/08* (2020.01)

(58) Field of Classification Search
USPC ........................................................ 716/100
See application file for complete search history.

(56) References Cited

U.S. PATENT DOCUMENTS

| | | | | | |
|---|---|---|---|---|---|
| 11,341,304 | B2 * | 5/2022 | Raman | ..................... | G06F 30/27 |
| 2021/0173993 | A1 * | 6/2021 | Raman | ..................... | G06N 3/09 |
| 2022/0035927 | A1 * | 2/2022 | Lysecky | ................ | G06F 21/566 |

FOREIGN PATENT DOCUMENTS

| | | | | | |
|---|---|---|---|---|---|
| CN | 112685988 | A * | 4/2021 | ............. | G06N 3/065 |
| CN | 114730352 | A * | 7/2022 | ............... | G06N 3/09 |

OTHER PUBLICATIONS

Breiman, Leo, "Random Forests," Machine Learning, vol. 45, Oct. 2001, pp. 5-32, retrieved from <https://doi.org/10.1023/A:1010933404324> on Nov. 25, 2025, 28 pages.

(Continued)

*Primary Examiner* — Mohammed Alam
(74) *Attorney, Agent, or Firm* — Hanley, Flight & Zimmerman, LLC

(57) ABSTRACT

Methods, apparatus, systems, and articles of manufacture are disclosed for methods and apparatus to generate I/O timing constraint predictions for system-on-chips using machine learning. An apparatus is disclosed herein comprising at least one memory, machine readable instructions, and processor circuitry to at least one of instantiate or execute the machine readable instructions to extract delay features from a first system-on-chip design and a second system-on-chip design, apply a machine learning model to the extracted delay features to determine an estimated delay for the first system-on-chip design, compare the estimated delay for the first system-on-chip design to the second system-on-chip design to determine an error of the first system-on-chip design, and update the second system-on-chip design based on the error determined for the first system-on-chip design.

25 Claims, 13 Drawing Sheets

(56) References Cited

OTHER PUBLICATIONS

Nasteski, Vladimir, "An Overview of the Supervised Machine Learning Methods," Horizons, vol. 4, Dec. 2017, retrieved from <https://www.researchgate.net/publication/328146111_An_overview_of_the_supervised_machine_learning_methods> on Nov. 25, 2025, 11 pages.
Barboza et al., "Machine Learning-Based Pre-Routing Timing Prediction with Reduced Pessimism," 56th ACM/IEEE Design Automation Conference, Jun. 2-6, 2019, retrieved from <https://ieeexplore.ieee.org/document/8807063> on Nov. 25, 2025, 6 pages.
Gotra et al., "Simultaneous Multi Voltage Aware Timing Analysis Methodology for SOC using Machine Learning," IEEE 33rd International System-on-Chip Conference (SOCC), Sep. 8-11, 2020, retrieved from <doi.org/10.1109/SOCC49529.2020.9524780> on Nov. 25, 2025, 4 pages.

* cited by examiner

METHODS AND APPARATUS TO GENERATE CIRCUIT TIMING CONSTRAINT PREDICTIONS USING MACHINE LEARNING

RELATED APPLICATION

This patent claims the benefit of U.S. Provisional Patent Application No. 63/403,858 which was filed on Sep. 5, 2022. U.S. Provisional Patent Application No. 63/403,858 is hereby incorporated herein by reference in its entirety. Priority to U.S. Provisional Patent Application No. 63/403,858 is hereby claimed.

FIELD OF THE DISCLOSURE

This disclosure relates generally to circuit design and, more particularly, to methods and apparatus to generate circuit timing constraint predictions for system-on-chips using machine learning.

BACKGROUND

Circuit design (e.g., system-on-chip (SOC) design) typically includes a process of creating an initial design for the layout of components on the circuit followed by testing the design to verify its functionality/effectiveness. The process is usually iterative and SOC designs usually change between these iterations based on the testing performed. Once the design reaches a point where the testing produces acceptable results (e.g., timing requirements, circuit efficiency, power consumption, etc. are met), the SOC design is formalized and signed off for production/use in a particular application.

BRIEF DESCRIPTION OF THE DRAWINGS

In general, the same reference numbers will be used throughout the drawing(s) and accompanying written description to refer to the same or like parts. The figures are not to scale.

Figure 1:
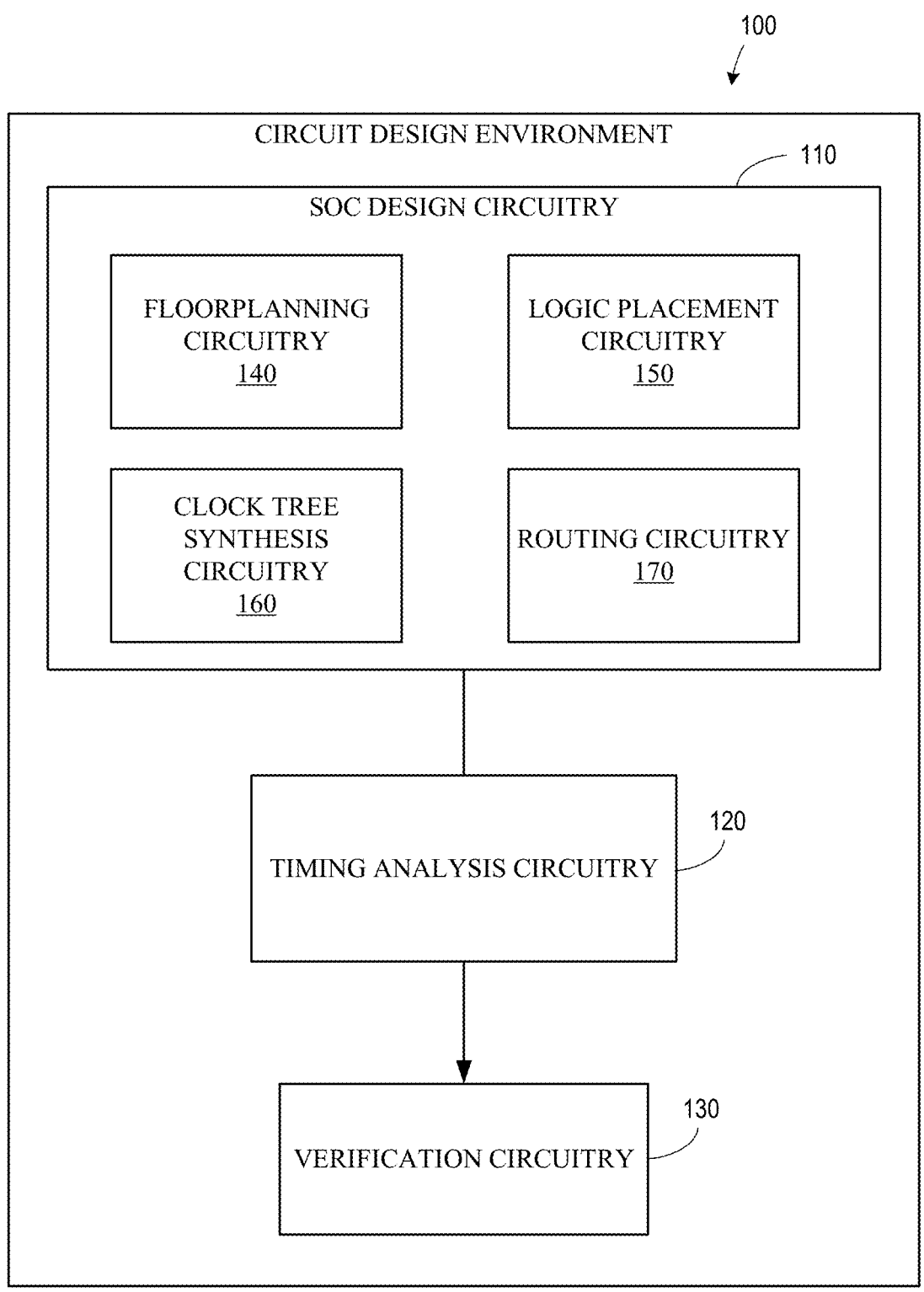
FIG. 1 is a block diagram of a circuit design environment.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

In system-on-chip (SOC) designing, engineers create a theoretical layout of components for the SOC, each component having timing requirements, power consumption requirements, etc. This designing phase is an iterative process, where each design is subjected to a series of tests to determine the efficiency and effectiveness of the design. If the design does not meet the requirements set forth, the design is re-worked and re-tested. This iterative process continues until the design objectives/requirements are met, at which point, the design is then signed off and approved for manufacturing/use in the designed application.

Each iteration of the design phase can take anywhere from two to three weeks, and SOCs typically go through ten to twelve iterations before the design is approved. This means that each design iteration, not counting the initial engineering time to create the initial design, adds up to anywhere from five to nine months (twenty to thirty-six weeks). Current testing methods currently employ a predictive process for determining the adequacy of the SOC by using a base model to compare a prediction to a pre-determined series of actual data points from alternative SOC designs. This leaves a burden on the design engineers to take the results from the comparison and create a new iteration of the design, and then subject that new design to the same comparison as the first design. This process is inefficient, costly, and time intensive.

The use of a machine learning model to update the comparison algorithm based on information learned from the previous iteration is highly desirable, as it can speed up the design process and reduce iteration cycles. Disclosed herein is a solution that utilizes machine learning to reduce the number of iterations required in the design phase of SOC manufacturing which reduced cost and turnaround time (TAT).

FIG. 1 is a block diagram of a circuit design environment 100. The example circuit design environment 100 includes example SOC design circuitry 110, example timing analysis circuitry 120, and example verification circuitry 130. In some examples, the timing analysis circuitry 120 is performed after the SOC design circuitry 110 has completed its operations. In some examples, the SOC design circuitry 110 can be re-performed after the timing analysis circuitry 120 has completed.

The example SOC design circuitry 110 of the illustrated example of FIG. 1 creates an SOC design. The SOC design circuitry 110 includes floorplanning circuitry 140, logic placement circuitry 150, clock tree synthesis circuitry 160, and routing circuitry 170. In some examples, the SOC design circuitry is performed in the order described herein (e.g., floorplanning circuitry 140, logic placement circuitry 150, clock tree synthesis circuitry 160, and then routing circuitry 170). In other examples, the SOC design circuitry 110 can include additional steps and/or the steps described herein can be repeated or rearranged.

The floorplanning circuitry 140 of the illustrated example of FIG. 1 determines the placement of physical components within the SOC design. In some examples, the design is broken down into subsystems based on the amount of physical space available, requirements, and/or the system-level (e.g., entire SOC) architecture/design criteria. The subsystems can further be broken down into partitions, which can represent individual components and/or operations that occur within the subsystem. The floorplanning circuitry 140 can further define the input-output (I/O) boundaries and power distribution throughout the SOC, subsystems, and partitions.

The logic placement circuitry 150 of the illustrated example of FIG. 1 assigns the placement of standard cells (e.g., a group of transistor and interconnect structures that provides a boolean logic function (e.g., AND, OR, XOR, XNOR, inverters, etc.) or a storage function (e.g., flipflop, latch, etc.)) and assigns the standard cells to a legal location (e.g., the location of logic gates within the SOC). In some examples, the logic placement circuitry 150 performs an analysis to ensure that logic gates do not interfere with each other, and in some examples, may flag erroneous and/or incorrect legal location placement of standard cells.

The clock tree synthesis circuitry 160 of the illustrated example of FIG. 1 creates/synthesizes a clock network (e.g., creating a timing schedule for each SOC/subsystem/partition to execute on the timing schedule). In some examples, an ideal clock network is designed to assume that the clock reaches all standard cells at the same time, without accounting for cell delays. Creating the clock network allows the SOC to execute computer functions, such as functions defined in the standard cells, on a defined schedule to ensure the SOC design meets the timing requirements.

The routing circuitry 170 of the illustrated example of FIG. 1 creates a physical routing network to connect the partitions (and all subcomponents therein) together. In some examples, the routing circuitry 170 physically routes all I/O boundaries with respect to the SOC, subsystems, and partitions to create an electrically connected SOC where current/voltage is supplied to each subsystem/partition/cell. The physical routing network, in some examples, is the final stage of the SOC design circuitry 110 (e.g., design phase) before the SOC is tested to determine whether the design meets the defined requirements.

The timing analysis circuitry 120 of the illustrated example of FIG. 1 tests the SOC design to determine if the design meets the timing requirements and creates I/O timing constraints. Such timing requirements may include maximum cell delay (e.g., delay to transition output signal based on change in input signal), maximum resistor-capacitor (RC) delay (e.g., delay in signal speed through the ROC/subsystem/partition due to resistance and capacitance interference), maximum timing window available (e.g., max cycle time), etc. Each component within the SOC carries a measurable amount of delay propagation throughout the SOC. Those delays should be accounted for when creating timing constraints (e.g., when certain subsystems/partitions execute, a staggered execution cycle, etc.) in order to efficiently calculate timing delays within the SOC design. In some examples, the timing analysis circuitry 120 includes a testing mechanism for determining the total/net delay within the SOC/subsystem/partition/cell which reduces design iteration cycles.

In some examples, the timing analysis circuitry 120 can indicate that the current SOC design (e.g., a first iteration) does not meet the timing requirements set forth. In such an example, the SOC design circuitry 110 is re-initiated to create a second iteration of the SOC design. The SOC design circuitry 110, in some examples, can produce a second iteration of the SOC design at which the timing analysis circuitry 120 can conduct a second testing iteration on the second iteration of the SOC design. This process can repeat until the timing requirements with the current iteration of the SOC design are met.

In some examples, the timing analysis circuitry 120 includes a testing mechanism utilizing a machine learning model for outputting the I/O timing constraints. As stated above, the iteration cycle for SOC designs may last two to three weeks, and a final SOC design may consist of ten to twelve iterations. In utilizing the machine learning model, the timing analysis circuitry 120 reduces the iterations required to approve/sign off an SOC design. In such an example, the machine learning model of the timing analysis circuitry 120 learns from a previous iteration to more accurately predict timing delays regarding the standard cells and/or the RC delays. The number of iterations is reduced by learning from the previous iteration (e.g., the first iteration) and applying the learned results to the next iteration (e.g., the second iteration). In the examples described herein, the number of iterations can be reduced by 30-40% (equating to reducing anywhere from one to four months of SOC development time). Further information regarding the machine learning testing mechanism is described herein in reference to FIGS. 2 and/or 4.

The verification circuitry 130 of the illustrated example of FIG. 1 verifies the SOC design. In some examples, the verification circuitry 130 also signs off the SOC design for production and/or use in the designed application. The verification circuitry 130 performs a series of checks that ensures the logical and electrical functionality of the SOC design. Such example checks may include a DRC (Design Rule Check), an LVS (Layout Vs Schematic) analysis, an ERC (Electrical Rule Check), an Antenna check, and/or an EM (Electromigration Analysis). Once the SOC design passes all necessary checks, the SOC design is then approved/signed off for manufacture/fabrication.

Figure 2:
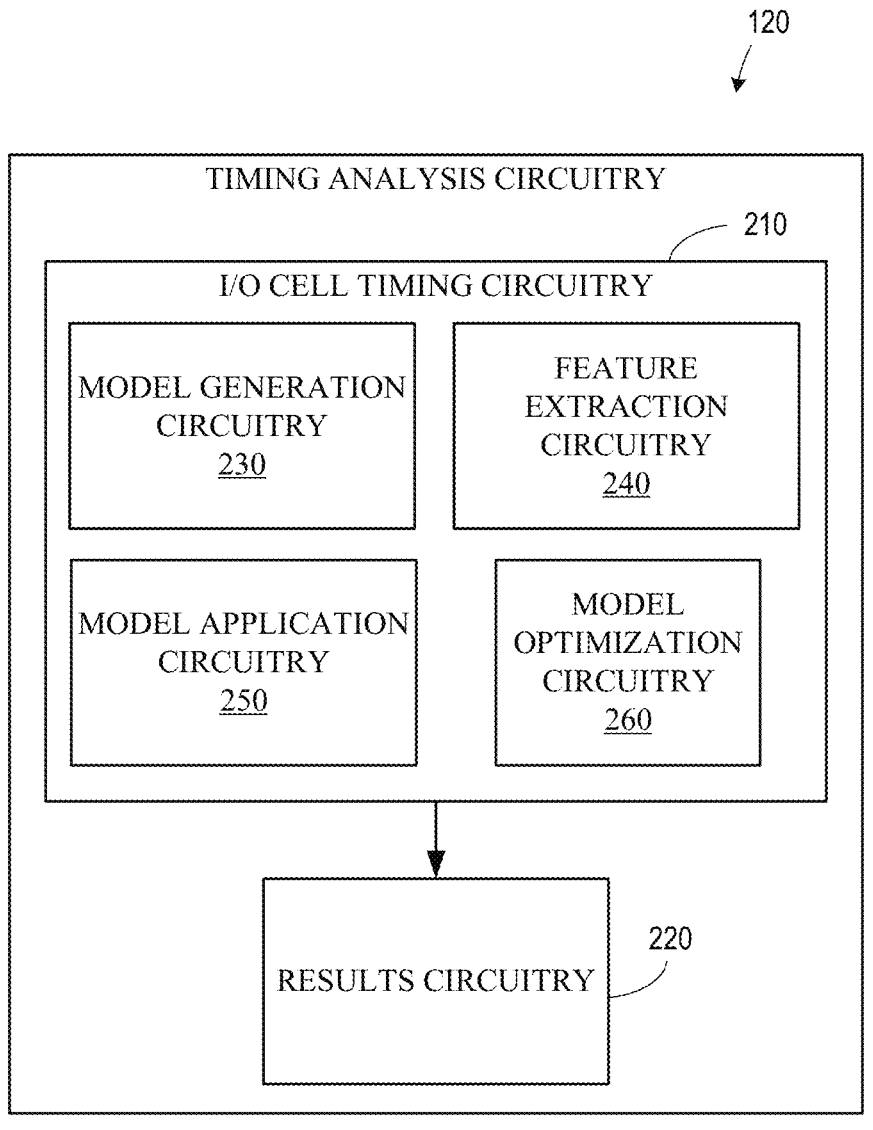
FIG. 2 is a block diagram of an example implementation of the timing analysis circuitry of FIG. 1.

FIG. 2 is a block diagram representing an example implementation of the timing analysis circuitry 120 of FIG. 1. The timing analysis circuitry 120 of FIG. 2 may be instantiated (e.g., creating an instance of, bring into being for any length of time, materialize, implement, etc.) by processor circuitry such as a central processing unit executing instructions. Additionally or alternatively, the timing analysis circuitry 120 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

The timing analysis circuitry 120 of the illustrated example of FIG. 2 includes I/O cell timing circuitry 210 and results circuitry 220. The I/O cell timing circuitry 210 further includes model generation circuitry 230, feature extraction circuitry 240, model application circuitry 250, and model optimization circuitry 260.

The I/O cell timing analysis circuitry 210 of the illustrated example of FIG. 2 performs an I/O timing analysis on the SOC design. In some examples, the I/O cell timing analysis circuitry 210 is instantiated by processor circuitry executing I/O cell timing analysis instructions and/or configured to perform operations such as those represented by the flowchart of FIG. 4.

In some examples, the circuit design environment 100 includes means for performing a timing analysis on an SOC design. For example, the means for performing a timing analysis on an SOC design may be implemented by I/O cell timing analysis circuitry 210. In some examples, the I/O cell timing analysis circuitry 210 may be instantiated by processor circuitry such as the example processor circuitry 1012 of FIG. 10. For instance, the I/O cell timing analysis circuitry 210 may be instantiated by the example microprocessor 1100 of FIG. 11 executing machine executable instructions such as those implemented by at least blocks 410, 420, 430, 432, 434, 436, 440, 450, 460, and 470 of FIG. 4. In some examples, the I/O cell timing analysis circuitry 210 may be instantiated by hardware logic circuitry, which may be implemented by an ASIC, XPU, or the FPGA circuitry 1200 of FIG. 12 structured to perform operations corresponding to the machine readable instructions. Additionally or alternatively, the I/O cell timing analysis circuitry 210 may be instantiated by any other combination of hardware, software, and/or firmware. For example, the I/O cell timing analysis circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The model generation circuitry 230 of the illustrated example of FIG. 2 generates the machine learning model to be applied to the SOC design. In some examples, the model generation circuitry 230 is instantiated by processor circuitry executing model generation instructions and/or configured to perform operation such as those represented by the flowcharts of FIGS. 4 and/or 6.

In some examples, the circuit design environment 100 includes means for generating a machine learning model. For example, the means for generating a machine learning model may be implemented by model generation circuitry 230. In some examples, the model generation circuitry 230 may be instantiated by processor circuitry such as the example processor circuitry 1012 of FIG. 10. For instance, the model generation circuitry 230 may be instantiated by the example microprocessor 1100 of FIG. 11 executing machine executable instructions such as those implemented by at least blocks 436 of FIGS. 4 and 610, 620, 630, 640, 650, and 660 FIG. 6. In some examples, model generation circuitry 230 may be instantiated by hardware logic circuitry, which may be implemented by an ASIC, XPU, or the FPGA circuitry 1200 of FIG. 12 structured to perform operations corresponding to the machine readable instructions. Additionally or alternatively, the model generation circuitry 230 may be instantiated by any other combination of hardware, software, and/or firmware. For example, the model generation circuitry 230 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The feature extraction circuitry 240 of the illustrated example of FIG. 2 extracts features representative of timing delay within the SOC design. In some examples, the feature extraction circuitry 240 is instantiated by processor circuitry executing feature extraction instructions and/or configured to perform operations such as those represented by the flowchart of FIG. 4.

In some examples, the circuit design environment 100 includes means for extracting features representative of timing delay. For example, the means for extracting features representative of timing delay may be implemented by feature extraction circuitry 240. In some examples, the feature extraction circuitry 240 may be instantiated by processor circuitry such as the example processor circuitry 1012 of FIG. 10. For instance, the feature extraction circuitry 240 may be instantiated by the example microprocessor 1100 of FIG. 11 executing machine executable instructions such as those implemented by at least blocks 410 and 420 of FIG. 4. In some examples, feature extraction circuitry 240 may be instantiated by hardware logic circuitry, which may be implemented by an ASIC, XPU, or the FPGA circuitry 1200 of FIG. 12 structured to perform operations corresponding to the machine readable instructions. Additionally or alternatively, the feature extraction circuitry 240 may be instantiated by any other combination of hardware, software, and/or firmware. For example, the feature extraction circuitry 240 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The model application circuitry 250 of the illustrated example of FIG. 2 applies the machine learning model to the extracted features. In some examples, the model application circuitry 250 is instantiated by processor circuitry executing feature extraction instructions and/or configured to perform operations such as those represented by the flowchart of FIG. 4.

In some examples, the circuit design environment 100 includes means for applying a machine learning model to extracted features. For example, the means for applying a machine learning model to extracted features may be implemented by model application circuitry 250. In some examples, the model application circuitry 250 may be instantiated by processor circuitry such as the example processor circuitry 1012 of FIG. 10. For instance, the model application circuitry 250 may be instantiated by the example microprocessor 1100 of FIG. 11 executing machine executable instructions such as those implemented by at least block 440 of FIG. 4. In some examples, model application circuitry 250 may be instantiated by hardware logic circuitry, which may be implemented by an ASIC, XPU, or the FPGA circuitry 1200 of FIG. 12 structured to perform operations corresponding to the machine readable instructions. Additionally or alternatively, the model application circuitry 250 may be instantiated by any other combination of hardware, software, and/or firmware. For example, the model application circuitry 250 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The model optimization circuitry 260 of the illustrated example of FIG. 2 optimizes the machine learning model. In some examples, the model optimization circuitry 260 relearns (e.g., update hyperparameters associated with the machine learning algorithm such as decision tree depth, learning rate, etc.) the machine learning model based on feedback from executing the IO cell timing analysis circuitry 210 on the previous iteration of the SOC design. In some examples, the model optimization circuitry 260 is instantiated by processor circuitry executing feature extraction instructions and/or configured to perform operations such as those represented by the flowcharts of FIGS. 4 and/or 7.

In some examples, the circuit design environment 100 includes means for optimizing the machine learning model. For example, the means for optimizing the machine learning model may be implemented by model optimization circuitry 260. In some examples, the model optimization circuitry 260 may be instantiated by processor circuitry such as the example processor circuitry 1012 of FIG. 10. For instance, the model optimization circuitry 260 may be instantiated by the example microprocessor 1100 of FIG. 11 executing machine executable instructions such as those implemented by at least blocks 434 of FIGS. 4 and 710, 720, 730, 740, 750, 755, 760, and 770 of FIG. 7. In some examples, model optimization circuitry 260 may be instantiated by hardware logic circuitry, which may be implemented by an ASIC, XPU, or the FPGA circuitry 1200 of FIG. 12 structured to perform operations corresponding to the machine readable instructions. Additionally or alternatively, the model optimization circuitry 260 may be instantiated by any other combination of hardware, software, and/or firmware. For example, the model optimization circuitry 260 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The results circuitry 220 of the illustrated example of FIG. 2 outputs the result of the machine learning model applied to the extracted features. In some examples, the results circuitry 220 converts the result to timing constraints which is used by the SOC design to meet the requirements. In some examples, the results circuitry 220 is instantiated by processor circuitry executing feature extraction instructions and/or configured to perform operations such as those represented by the flowchart of FIG. 4.

In some examples, the circuit design environment 100 includes means for outputting a result of the machine learning model applied to the extracted features. For example, the means for outputting a result of the machine learning model applied to the extracted features may be implemented by results circuitry 220. In some examples, the results circuitry 220 may be instantiated by processor circuitry such as the example processor circuitry 1012 of FIG. 10. For instance, the results circuitry 220 may be instantiated by the example microprocessor 1100 of FIG. 11 executing machine executable instructions such as those implemented by at least blocks 450, 460, and 470 of FIG. 4. In some examples, results circuitry 220 may be instantiated by hardware logic circuitry, which may be implemented by an ASIC, XPU, or the FPGA circuitry 1200 of FIG. 12 structured to perform operations corresponding to the machine readable instructions. Additionally or alternatively, the results circuitry 220 may be instantiated by any other combination of hardware, software, and/or firmware. For example, the results circuitry 220 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the timing analysis circuitry 120 of FIG. 1 is illustrated in FIG. 2, one or more of the elements, processes, and/or devices illustrated in FIG. 2 may be combined, divided, rearranged, omitted, eliminated, and/or implemented in any other way. Further, the example I/O cell timing circuitry 210, the example results circuitry 220, the example model generation circuitry 230, the example feature extraction circuitry 240, the example model application circuitry 250, the example model optimization circuitry 260, and/or, more generally, the example timing analysis circuitry 120 of FIG. 1, may be implemented by hardware alone or by hardware in combination with software and/or firmware. Thus, for example, any of the example I/O cell timing circuitry 210, the example results circuitry 220, the example model generation circuitry 230, the example feature extraction circuitry 240, the example model application circuitry 250, the example model optimization circuitry 260, and/or, more generally, the example timing analysis circuitry 120, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device (s) (FPLD(s)) such as Field Programmable Gate Arrays (FPGAs). Further still, the example timing analysis circuitry 120 of FIG. 1 may include one or more elements, processes, and/or devices in addition to, or instead of, those illustrated in FIG. 2, and/or may include more than one of any or all of the illustrated elements, processes and devices.

Flowcharts representative of example machine readable instructions, which may be executed to configure processor circuitry to implement the circuit design environment 100 of FIG. 1, is shown in FIGS. 3, 4, 6, 7, and/or 8. The machine readable instructions may be one or more executable programs or portion(s) of an executable program for execution by processor circuitry, such as the processor circuitry 1012 shown in the example processor platform 1000 discussed below in connection with FIG. 10 and/or the example processor circuitry discussed below in connection with FIGS. 11 and/or 12. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 3, many other methods of implementing the example circuit design environment 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may be to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3, 4, 6, 7, and/or 8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 3:
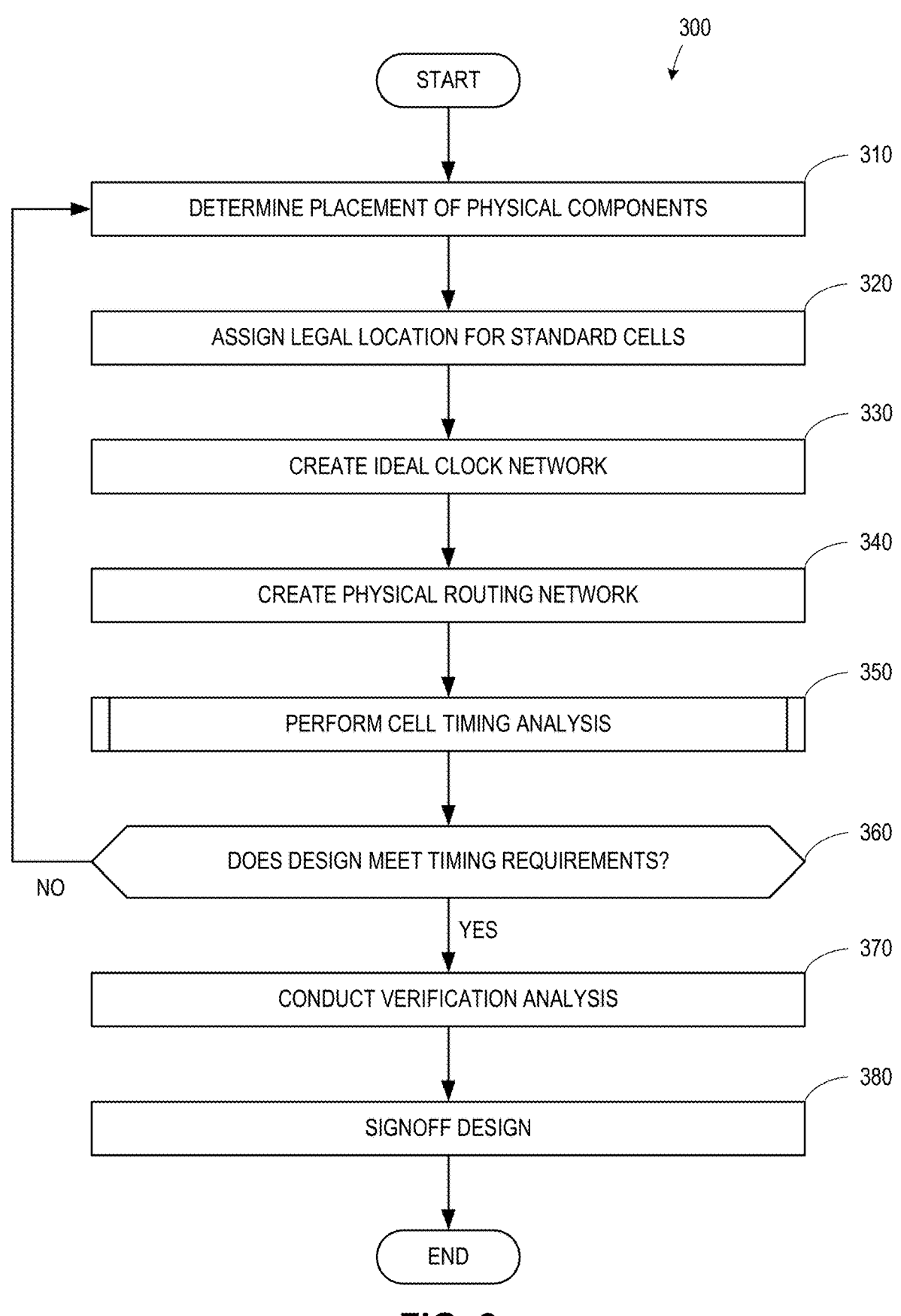
FIG. 3 is a flowchart representative of example machine readable instructions and/or example operations that may be executed by example processor circuitry to implement the circuit design environment of FIG. 1.

FIG. 3 is a flowchart representative of example machine readable instructions and/or example operations that may be executed and/or instantiated by processor circuitry to implement the SOC manufacturing environment of FIG. 1. The SOC manufacturing process 300 of FIG. 3 begin at block 310, at which the floorplanning circuitry 140 determines a placement of physical components in the SOC. Physical components may include integrated circuits (IC), memory stores (such as RAM, HDD, SDD, cache, etc.), etc. In some examples, the determination of the physical components can be performed by machine readable instructions that create a layout of the components based on the amount of space available on the SOC, the amount of power available to the SOC, the functions that are to be performed by the SOC, requirements, etc. In other examples, the determination of the placement of the components is taken from a template and/or previously implemented SOC designs. In some examples, the machine readable instructions and/or operations performed by block 310 can also determine the subsystem and/or partition subdivisions within the SOC.

Once the physical layout/placement of the physical components on the SOC is completed, the SOC manufacturing process 300 of FIG. 3 then assigns a legal location for standard cells/storage functions (hereafter referred to as "cells"). (Block 320) In some examples, the cells include logic gates and/or flipflops/latches, and the machine readable instructions and/or operations performed by block 320 ensures that there is no interference between the cells. Such an interference may include current drops, magnetic interference of electrical signals flowing through the cells, etc. In some examples, the machine readable instructions and/or operations performed by block 320 also includes flagging/indicating erroneous and/or incorrect legal location placements.

When the legal location for the cells is completed, the SOC manufacturing process 300 of FIG. 3 then creates/synthesizes an ideal clock network. (Block 330). In some examples, the clock network identifies the execution timing for all components (and subdivisions thereof) by assuming an ideal clock (e.g., all components execute exactly when programmed and no interferences/delays are accounted for), which allows for the SOC manufacturing process 300 to determine if the SOC design can meet ideal timing requirements. In some examples, when the machine readable instructions and/or operations performed by block 330 determine that the SOC design provided cannot meet the ideal clock parameters, the design can be revised accordingly. In other examples, machine readable instructions and/or operations performed by block 330 can determine that the SOC design can operate under the ideal clock network and proceed to the next stage.

Once the ideal clock network is synthesized/created, the SOC manufacturing environment 300 of FIG. 3 then creates a physical routing network to connect all cells/partitions/subsystems. (Block 340). In some examples, the machine readable instructions and/or operations performed by block 340 allows the cells/partitions/subsystems/etc. to electrically connect.

After the instructions and/or operations of blocks 310 through 340 are completed, the SOC is then subjected to a timing analysis. (Block 350). In some examples, the timing analysis tests the SOC to determine whether the SOC meets the requirements set forth. (Block 360). As stated above, such requirements may include maximum cell delay, maximum RC delay, maximum timing window available, etc. Further information regarding the implementation of the machine readable instructions and/or operation of block 350 is in reference to FIG. 4.

If the timing analysis determines that the SOC does not meet the timing requirements (e.g., block 360 returns a result of NO), then the SOC manufacturing process 300 of blocks 310 through 350 are repeated until the timing requirements are met.

When the timing analysis of the SOC manufacturing process 300 of FIG. 3 determines that the SOC meets the timing requirements (e.g., block 360 returns a result of YES), then the SOC manufacturing process 300 conducts a verification analysis to verify the SOC meets additional design criteria/requirements. (Block 370). In some examples, as stated above, the verification analysis can include ensuring the logical and electrical functionality of the SOC meets the requirements by utilizing a DRC, an LVS analysis, an, an Antenna check, an EM analysis, and/or any additional or combination of known or unknown checks to verify the SOC functionality.

Once the verification analysis of block 370 is completed and determines that the SOC passes all requirements, then the SOC manufacturing environment 300 of FIG. 3 signs off the design for manufacturing.

Figure 4:
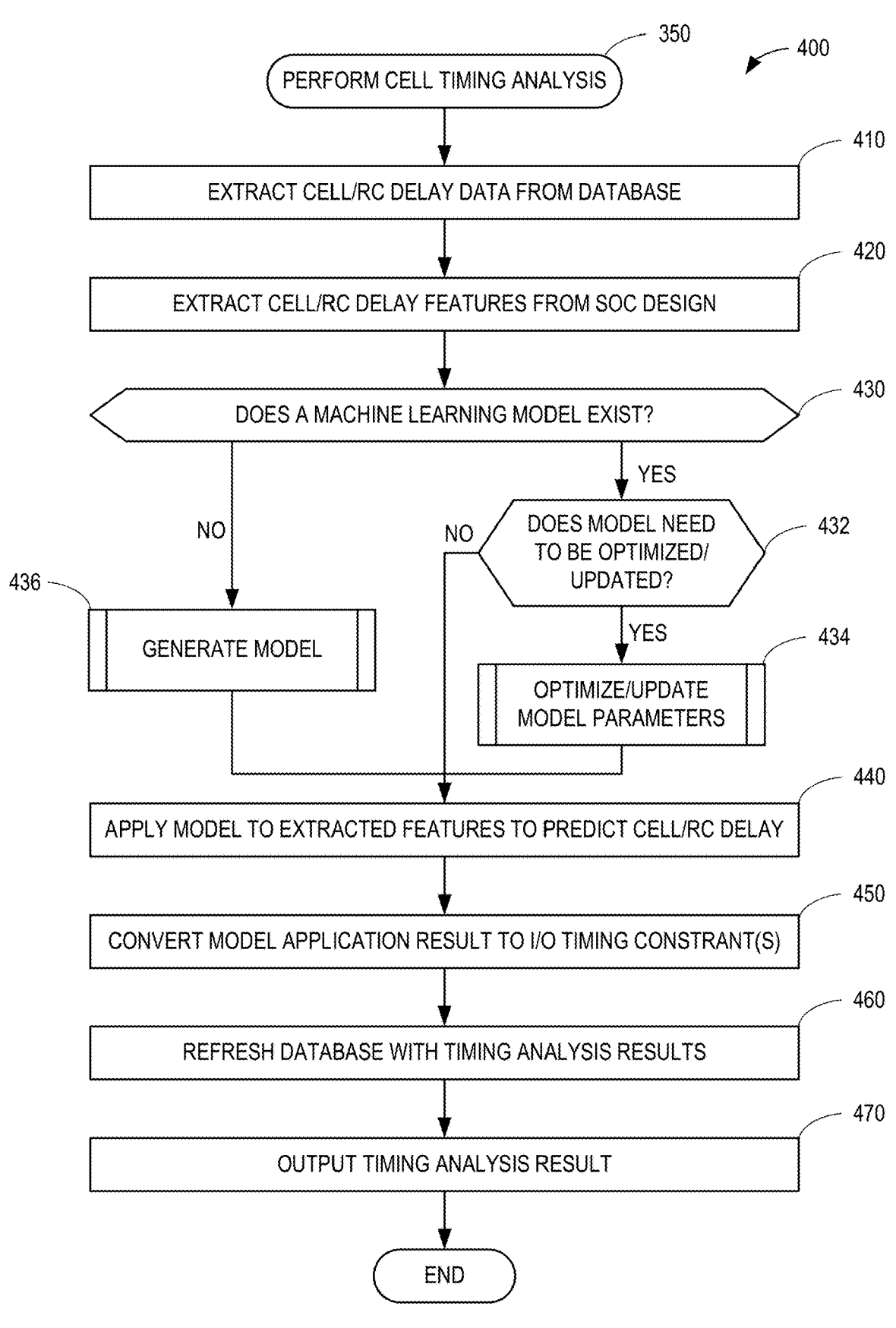
FIG. 4 is a flowchart representative of example machine readable instructions and/or example operations that may be executed by example processor circuitry to implement the timing analysis circuitry of FIG. 2.

FIG. 4 is a flowchart representative of example machine readable instructions and/or example operations that may be executed and/or instantiated by processor circuitry to implement the timing analysis circuitry 120 of FIG. 2. The example SOC timing analysis process 400 of FIG. 4 begin at block 410, at which the timing analysis circuitry 120 extracts cell/RC delay features from a database (e.g., an actual delay). Examples of cell/RC delay features may include, but are not limited to, logic depth, primary/secondary fanin/fanout, PVT (process, voltage and temperature sensors), distance from the center of the partition, timing window available, initial block delay (e.g., delay of a logic path inside the cell), logical hierarchical spread, cell distribution, etc. As used herein, a feature set refers to any combination and/or collection of features extracted by the timing analysis circuitry 120. An example feature set can include all of the previously defined features (e.g., logic depth, primary/secondary fanin/fanout, PVT, distance from the center of the partition, timing window available, initial block delay, logical hierarchical spread, and cell distribution). In some examples, the database includes an initial dataset for the delay features, the initial dataset applied by the model to compare to a predicted timing delay based on the SOC design. In some examples, for each subsequent iteration of the SOC design, the dataset applied by the model includes data that is updated based on the previous iteration of the SOC design.

The timing analysis circuitry 120 then extracts delay features based on the SOC design provided. (Block 420). In some examples, the feature set extracted based on the SOC design may be the same feature set extracted from the database. In this example, the predicted timing delay compared to the actual delay is exact and produces a more accurate result. In some examples, the predicted timing delay is calculated/evaluated based on the features extracted from the SOC design. The machine readable instructions and/or operations of blocks 410 and 420 may execute and/or instantiate simultaneously/in parallel or in series.

Next, the timing analysis circuitry 120 determines whether a machine learning model exists for the comparison of the actual delay to the predicted delay. (Block 430).

When the timing analysis circuitry 120 determined that there is a machine learning model for the comparison (e.g., block 430 returns a result of YES), the timing analysis circuitry 120 then determines if the machine learning model is to be updated or optimized. (Block 432). In some examples, the machine learning model can learn from the previous iteration of the SOC design, even when the previous iteration of the SOC design is faulty (e.g., mathematically incorrect, physically flawed, etc.). In such an example, or similar examples, the machine learning model learns such that the machine learning model becomes inefficient or deteriorates. In such an example, the machine learning model may be relearned/optimized to ensure the comparison produces better results. In other examples, the feature set and/or the algorithm for the comparison may be updated to expedite the learning process. In such an example, it may be determinable that increasing/decreasing the feature set or increasing/decreasing the resolution of the machine learning algorithm can result in better results. Further information regarding the optimizing/updating of the machine learning model is described herein with reference to FIG. 7.

Figure 7:
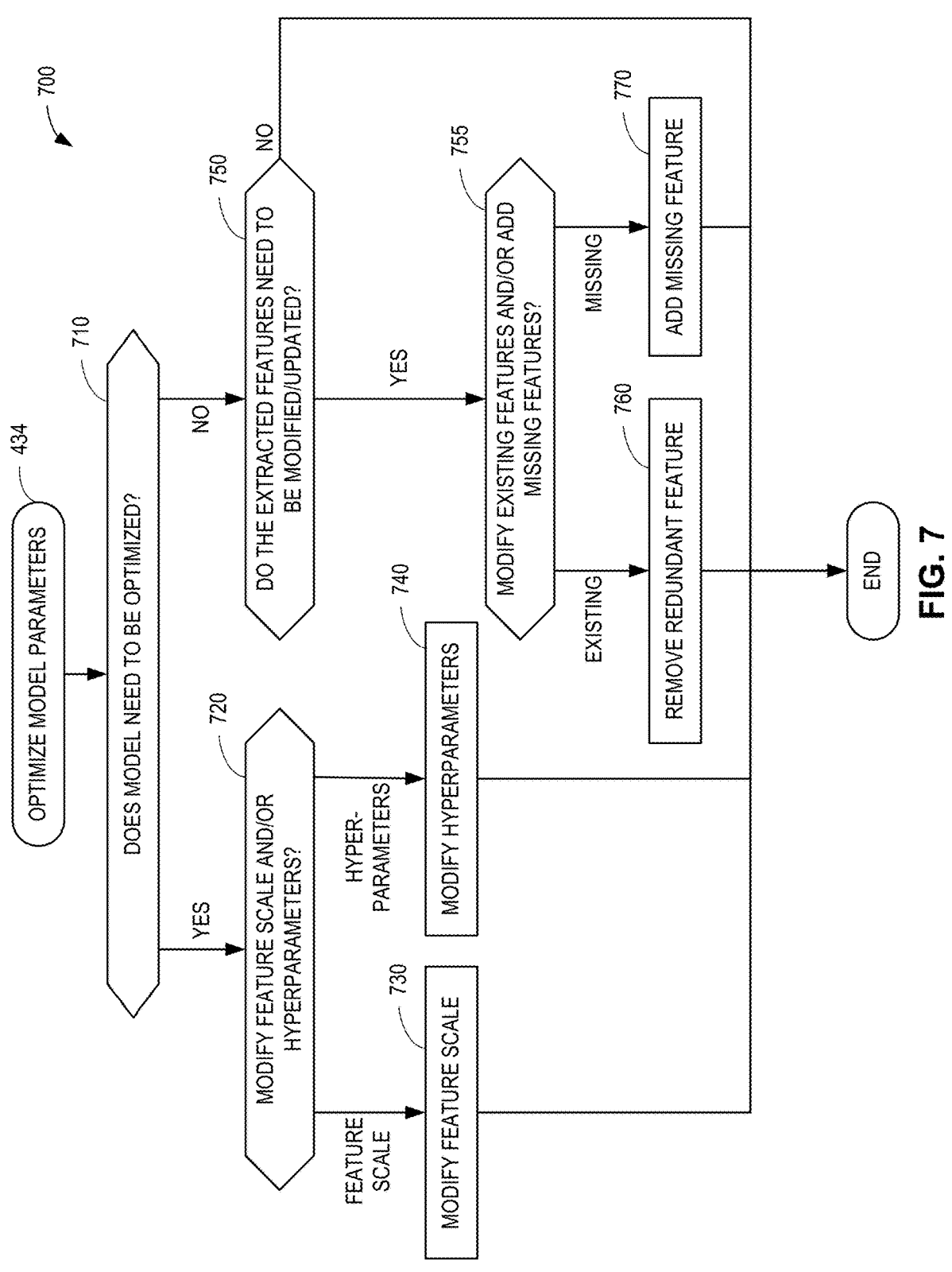
FIG. 7 is a flowchart representative of example machine readable instructions and/or example operations that may be executed by example processor circuitry to optimize the model parameters as illustrated in FIG. 4.

When the timing analysis circuitry 120 determines that the machine learning model is to be optimized/updated (e.g., block 432 returns a result of YES), the timing analysis circuitry 120 optimizes/updates the model using the machine readable instructions and/or operations as described in reference to FIG. 7. (Block 434).

When the timing analysis circuitry 120 determines that no machine learning model exists for the comparison (e.g., block 430 returns a result of NO), the timing analysis circuitry generates the machine learning model. (Block 436). In some examples, the machine learning model is generated based on a determination of the appropriate comparison algorithm and/or timing path (e.g., sequential, feedthrough, multicycle, etc.). Further information regarding generating the machine learning model is described herein with reference to FIG. 6.

When the timing analysis circuitry 120 determines that the machine learning model is not to be optimized/updated (e.g., block 432 returns a result of NO), completed the optimization/update of the machine learning model parameters of block 434, or completed the generation of the machine learning model of block 436, then the timing analysis circuitry 120 applies the machine learning model to the extracted features to predict the timing delay. (Block 440). In some examples, the machine learning model comparison algorithm uses decision trees (a supervised and controllable machine learning algorithm) to divide the database into smaller sub-sections based on a series of questions until user-defined hyperparameters are satisfied (e.g., values that control the learning process). An example decision tree is described herein with reference to FIG. 8. While the examples described herein refer to a supervised machine learning model using a decision tree, any other form of learning model and learning process may be interchangeably used herein. Such examples may include semi-supervised or un-supervised machine learning model and/or other machine learning models such as Reinforced Learning (RL), Deep Learning Models, etc.

In some examples, the decision tree (or some other machine learning model class) is applied to the predicted timing delay and the actual delay from the database. The result of the comparison is an absolute value of a deviation showing how far the predicted timing delay (current SOC design) is away from the actual delay (previous SOC design), hereafter referred to as the mean absolute error (MAE). As the machine learning model is applied to each SOC design iteration, the comparison result indicating a smaller MAE confirms an improvement in the design because the theoretical/predicted timing delay calculation from the current SOC design asymptotically approaches the actual delay from the previous SOC design.

Once the timing analysis circuitry 120 applies the machine learning model to the extracted features, the result of the machine learning model application is then converted into I/O timing constraints. (Block 450). Application of the I/O timing constraints may include creating a staggered execution schedule for certain cells/partitions, modify the clock network, etc. Revised I/O timing constraints may be utilized to re-optimize the internal design across clock and data network as well as logical/physical connectivity between design blocks.

The timing analysis circuitry 120 then refreshes (e.g., updates the data stored therein with new data) the database with the results from the machine learning model application to the extracted features. (Block 460). This allows the machine learning model to learn from the current iteration of the SOC design and apply the learning to the subsequent SOC design iteration.

Once the timing analysis circuitry 120 refreshes the database, the result of the timing analysis (e.g., the MAE, I/O timing constraints, etc.) is outputted. (Block 470). The circuit design environment 100 is then able to determine whether the current SOC design meets the requirements.

Figure 5:
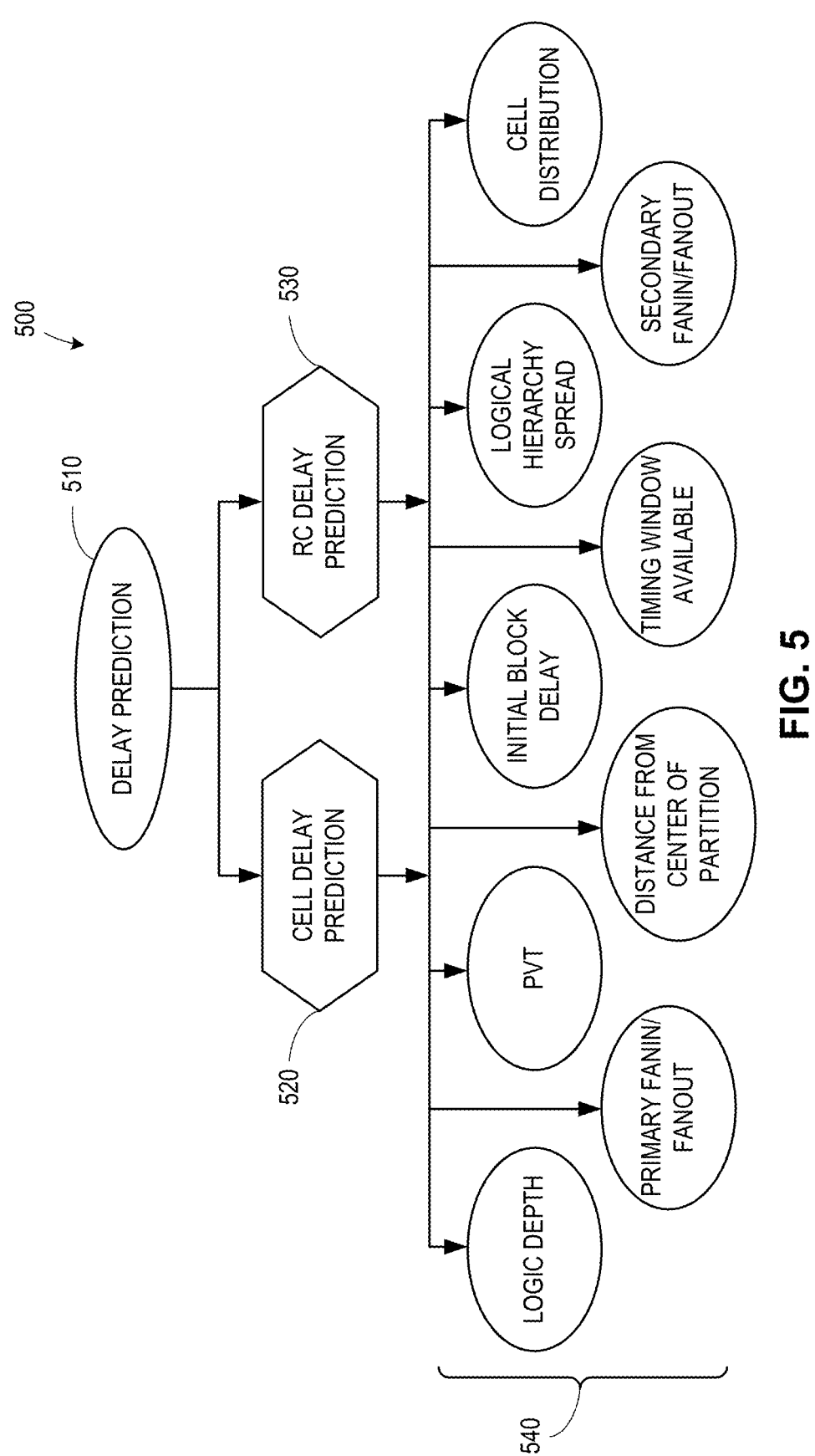
FIG. 5 is a block diagram of an example waterfall/expansion of the features of the timing analysis circuitry of FIG. 2.

FIG. 5 is a block diagram of an example waterfall/expansion 500 of the machine learning model down to the individual feature level. In some examples, the delay prediction 510 includes the cell delay prediction 520, the RC delay prediction (e.g., net delay) 530, and an example feature set 540. In some examples, two separate machine learning models can be run, one to predict the cell delay 520 and the other to predict the RC/net delay 530. The illustrated example of FIG. 5 shows that the cell delay predication 520 and the RC delay prediction 530 utilize the same feature set 540. In some examples, the cell delay predication 520 and the RC delay prediction 530 may utilize different feature sets and/or change the features within the feature set 540 (e.g., some features may be added or removed). In some examples, the machine learning model decides whether to change the feature set 540 by utilizing the output of the results circuitry 220 to improve the machine learning model.

Figure 6:
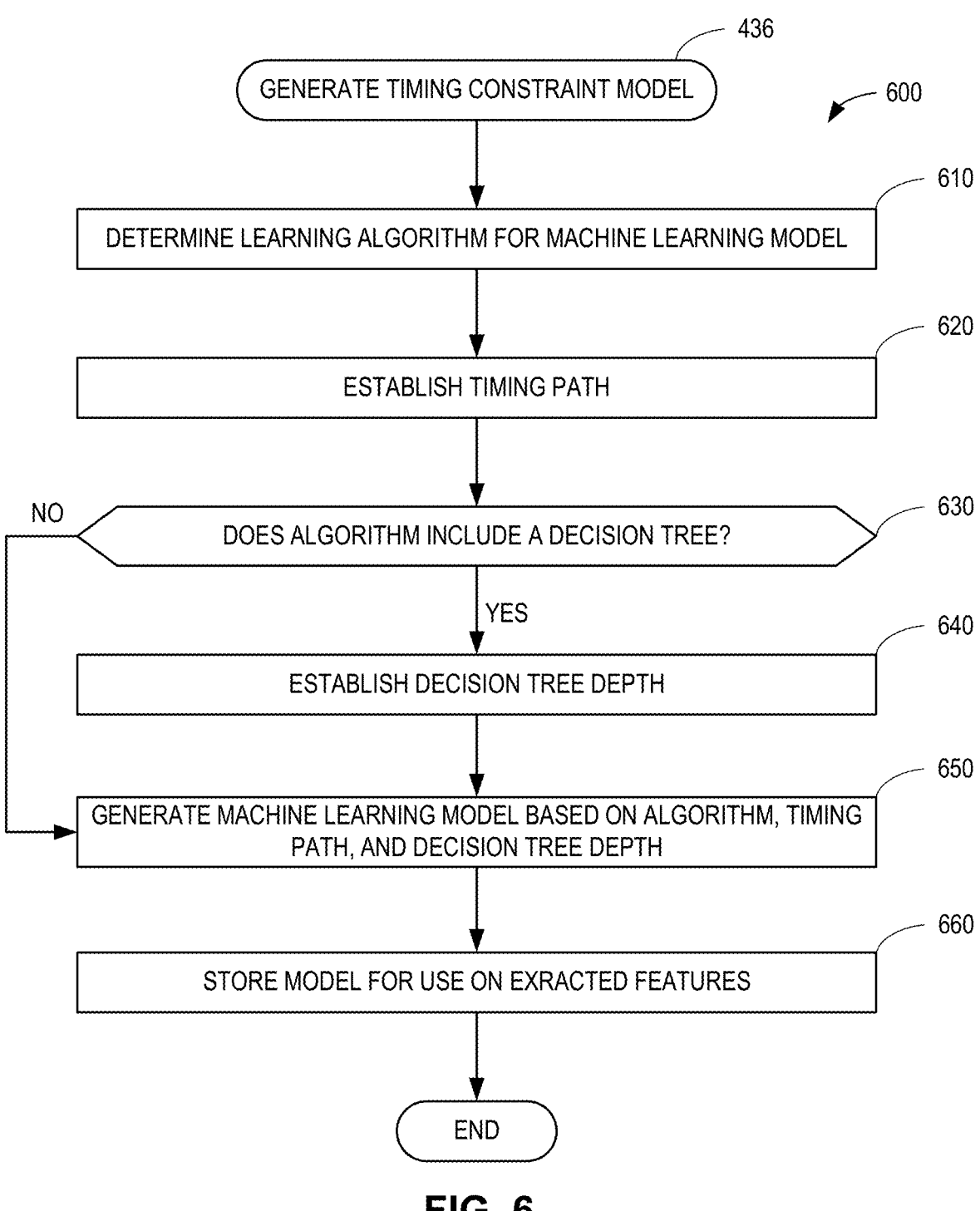
FIG. 6 is a flowchart representative of example machine readable instructions and/or example operations that may be executed by example processor circuitry to generate the timing constraint model as illustrated in FIG. 4.

FIG. 6 is a flowchart representative of example machine readable instructions and/or example operations that may be executed and/or instantiated by processor circuitry to implement the model generation circuitry 230 of FIG. 2. The example machine learning model generation process 600 of FIG. 6 begin at block 610, at which the model generation circuitry 230 determines the algorithm for the timing delay comparison. Examples of supervised learning regression algorithms include Artificial Neural Network (ANN), Support Vector Regressor (SVR), Linear Regressor (Lasso), Random Forest Regressor (RFR) and XGboost Regressor (XGB). In the examples described herein, a RFR algorithm is used which includes a decision tree algorithm that allows decision trees to execute parallelly which gives the machine learning model the ability to handle large datasets and understand the data more efficiently.

The model generation circuitry 230 then establishes the testing timing path to be used for the calculations. (Block 620). The timing path chosen changes the application of the algorithm because different timing paths can require different logical applications of the algorithms (such as sequential timing versus feedthrough timing paths). Examples of timing paths may include sequential, feedthrough, multicycle, etc. Different timing path scenarios, like sequential timing vs feedthrough timing vs Multi-cycle path, etc., change the list of relevant feature set for machine learning model training and hence different machine learning models, and other associated tuning parameter sets, may give better training accuracy.

Once the algorithm and timing path are established, the model generation circuitry 230 then determines whether the algorithm includes a decision tree. (Block 630). In some examples, the algorithm chosen may not include decision trees or to use some other form of machine learning model class, and thus may exclude this feature from the machine learning model.

When the model generation circuitry 230 determines that the algorithm includes the decision tree (e.g., block 630 returns a result of YES), then the model generation circuitry 230 establishes the initial decision tree depth (e.g., number of questions asked before a result is produced). (Block 640). In some examples, the effectiveness of the machine learning model may depend on the complexity of the decision tree and may produce better results when the decision tree depth is deeper (e.g., increasing the number of questions). In other examples, the depth of the decision tree does not affect the effectiveness of the machine learning model (such as by establishing more robust/complex questions instead of increasing the number of questions), and therefore a minimal decision tree depth may be sufficient to produce the result.

When the initial decision tree depth is established from block 640 or when the model generation circuitry 230 determines that the algorithm does not include a decision tree (e.g., block 630 returns a result of NO), then the machine learning model is generated based on the algorithm, timing path, and decision tree depth (if applicable). (Block 650).

Once the machine learning model is generated from block 650, the machine learning model is then stored to be applied to the extracted features. (Block 660). In some examples, the machine learning model is stored on a storage device (such as an HDD, SSD, RAM, cache, etc.) to be retrieved at a later time to be applied to the extracted features. In other examples, the machine learning model is applied directly to the extracted features and is not stored.

FIG. 7 is a flowchart representative of example machine readable instructions and/or example operations that may be executed and/or instantiated by processor circuitry to implement the model optimization circuitry 260 of FIG. 2. The model update process 700 of FIG. 7 begin at block 710, at which the model optimization circuitry 260 determines whether the machine learning model is to be optimized. In some examples, the machine learning model may be updated because it learned from bad data, the decision tree depth is not deep enough to predict a sufficient timing delay, the algorithm is insufficient/slow, etc.

When the model optimization circuitry 260 determines that the model is to be optimized (e.g., block 710 returns a result of YES), then the model optimization circuitry 260 determines whether to update the hyperparameters (e.g., decision tree depth, learning rate, etc.) or a feature scale (e.g., modify the algorithm to be more or less complex). (Block 720). In some examples, modifying feature scale may include changing the algorithm to a logarithmic or a square root for a particular feature to increase a computational resolution (e.g., reduce settling time, decrease overshoot, decrease rise time, etc.).

When the model optimization circuitry 260 determines that the feature scale is to be modified, the feature scale is modified according to a determination of whether the feature scale is to be more or less complex. (Block 730). Similarly, if the model optimization circuitry 260 determines that the hyperparameters are to be modified, then the hyperparameters are modified based on a determination of whether to update the decision tree depth, learning rate, etc. (Block 740).

In some examples, more than one optimization action can occur during the model update process 700. For example, the model optimization circuitry 260 may determine that the hyperparameters and the feature scale are to be optimized, and therefore update both. In other examples, the model optimization circuitry 260 may also determine that multiple hyperparameters and/or multiple features are to be scaled.

If the model optimization circuitry 260 determines that the machine learning model is not to be optimized (e.g., block 710 returns a result of NO), then the model optimization circuitry 260 determines whether the extracted features are to be modified/updated. (Block 750). In some examples, the feature set tested by the machine learning model may be updated so the machine learning model can produce a more accurate result (e.g., put more emphasis on features attributing to larger timing delay estimations, removing features that do not have an impact on timing delay, etc.).

When the model optimization circuitry 260 determines that the extracted features are to be modified/updated (e.g., block 750 returns a result of YES), then the model optimization circuitry 260 determines whether to modify existing features (e.g., removing redundant features) and/or add missing features. (Block 755).

When the model optimization circuitry 260 determines that the existing features are to be modified, the features are modified according to a determination of what to modify on the existing features. (Block 760). In some examples, the determination of what to modify on the existing features includes removing redundant features, modifying constants (e.g., clock period), etc.

Similarly, when the model optimization circuitry 260 determines that features are to be added, new features are added to the feature set based on a determination of which new features to add. (Block 770). In some examples, the determination of which new feature to add may include adding features purposefully omitted from the initial machine learning model to determine the machine learning model's effectiveness. Based on a determination that the machine learning model is not as effective as desired (e.g., the MAE produced is not converging/not converging fast enough), then the model optimization circuitry 260 may add those omitted features into the machine learning model to speed up/improve the convergence.

In some examples, more than one modification/update can occur during the model update process 700. For example, the model optimization circuitry 260 may determine that the existing features are to be modified/updated and features are to be added, and therefore perform both. In other examples, the model optimization circuitry 260 may also determine that multiple existing features are to be modified/updated and/or multiple features are to be added.

When the model optimization circuitry 260 has modified the feature scale from block 730, modified the hyperparameters from block 740, modified the existing features from block 760, and/or added features from block 770, then the model update process 700 concludes. The model update process 700 may, in some examples, perform/execute on each iteration of SOC designs produced.

Figure 8:
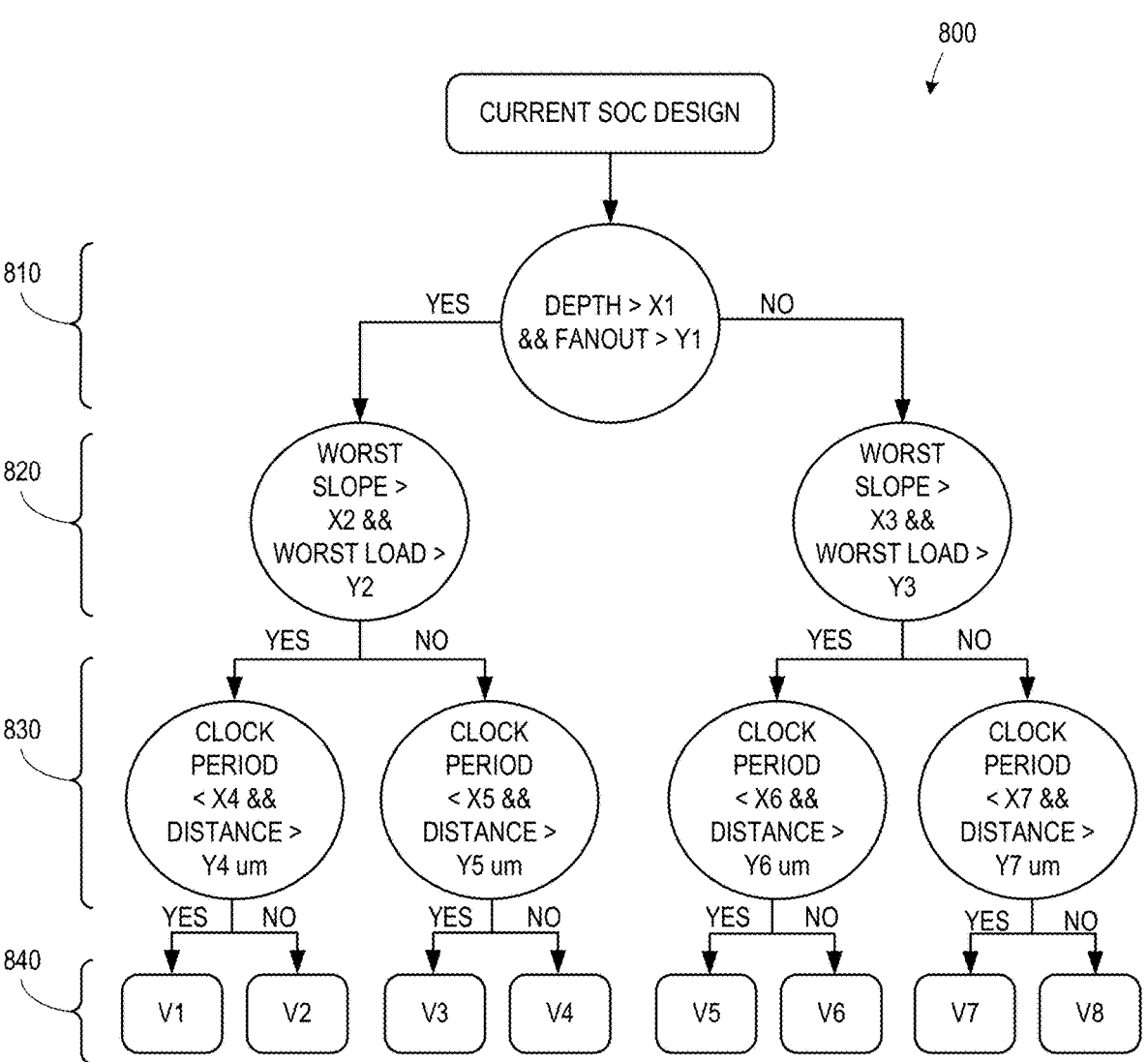
FIG. 8 an illustration of an example decision tree that may be used by the timing analysis circuitry of FIG. 1.

FIG. 8 is an illustration of an example decision tree 800 that may be used by the timing analysis circuitry 120 of FIG. 1. In some examples, the machine learning model subjects the current SOC design and the learned data from the database to a series of questions based on the feature set 540 provided. The example decision tree 800 includes a first layer 810, a second layer 820, a third layer 830, and a result layer 840. While the illustrated example of FIG. 8 shows a decision tree with four total layers, it should be understood that the decision tree 800 may include more or less layers than what is shown in FIG. 8. Each layer 810. 820. 830 represents a question that is asked based on the feature set 540, and each layer 810, 820, 830 are computed to get to the result layer 840 to ultimately output the result of the analysis (e.g., timing delay prediction). Based on the series of questions, a timing delay estimation can be produced by the machine learning model at the result layer 840 (e.g., V1-V8, etc.). In some examples, the decision tree depth may be deeper (e.g., includes more questions), where the result from the machine learning model may be more accurate and/or concise.

Figure 9:
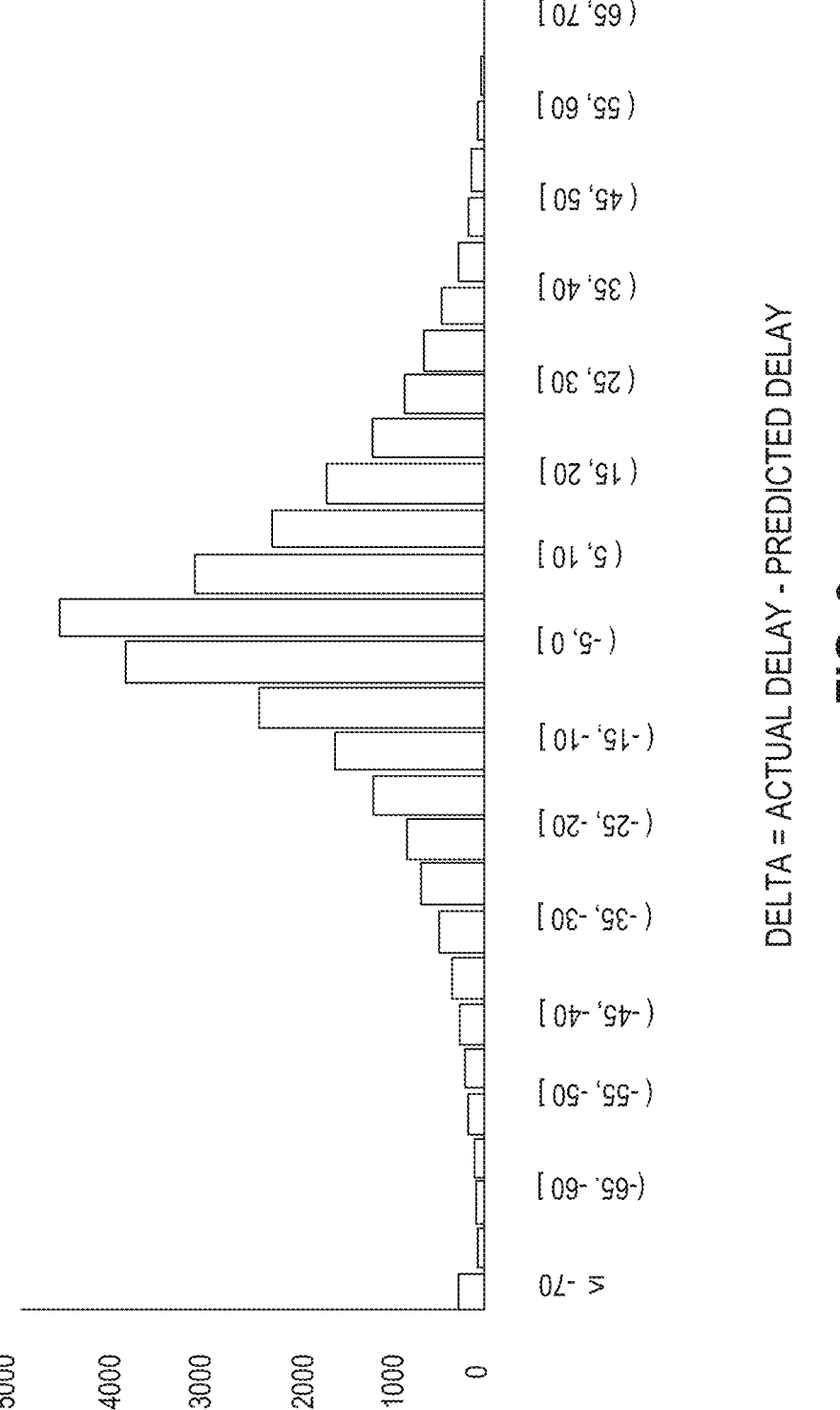
FIG. 9 is a chart of an error produced by the machine learning model of FIGS. 4, 6, and/or 7 compared to various pin counts of system-on-chip designs.

FIG. 9 is a chart of example error (in picoseconds, "ps") produced by the machine learning model compared to a pin count of an example SOC design. In some examples, the initial SOC design obtained from the database may include a pre-existing (and signed off) design which is based on an SOC with approximately 40,000 I/O ports. The chart of the illustrated example of FIG. 9 shows a delta (which is calculated as the difference between the actual delay based on the data provided from the database and the predicted delay based on the current SOC design) based on SOC designs with varying pin counts. Given a current iteration (e.g., iteration number 6), the delta is calculated using the previous iteration (e.g., iteration number 5) and the current iteration (e.g., iteration number 6). Typically, higher iteration numbers are used to train the machine learning model since the higher iteration numbers correspond to more stable I/O constraints which are more advanced in the timing constraint analysis. In the examples described herein, the error produced by the machine learning model is used to update the machine learning model.

Figure 10:
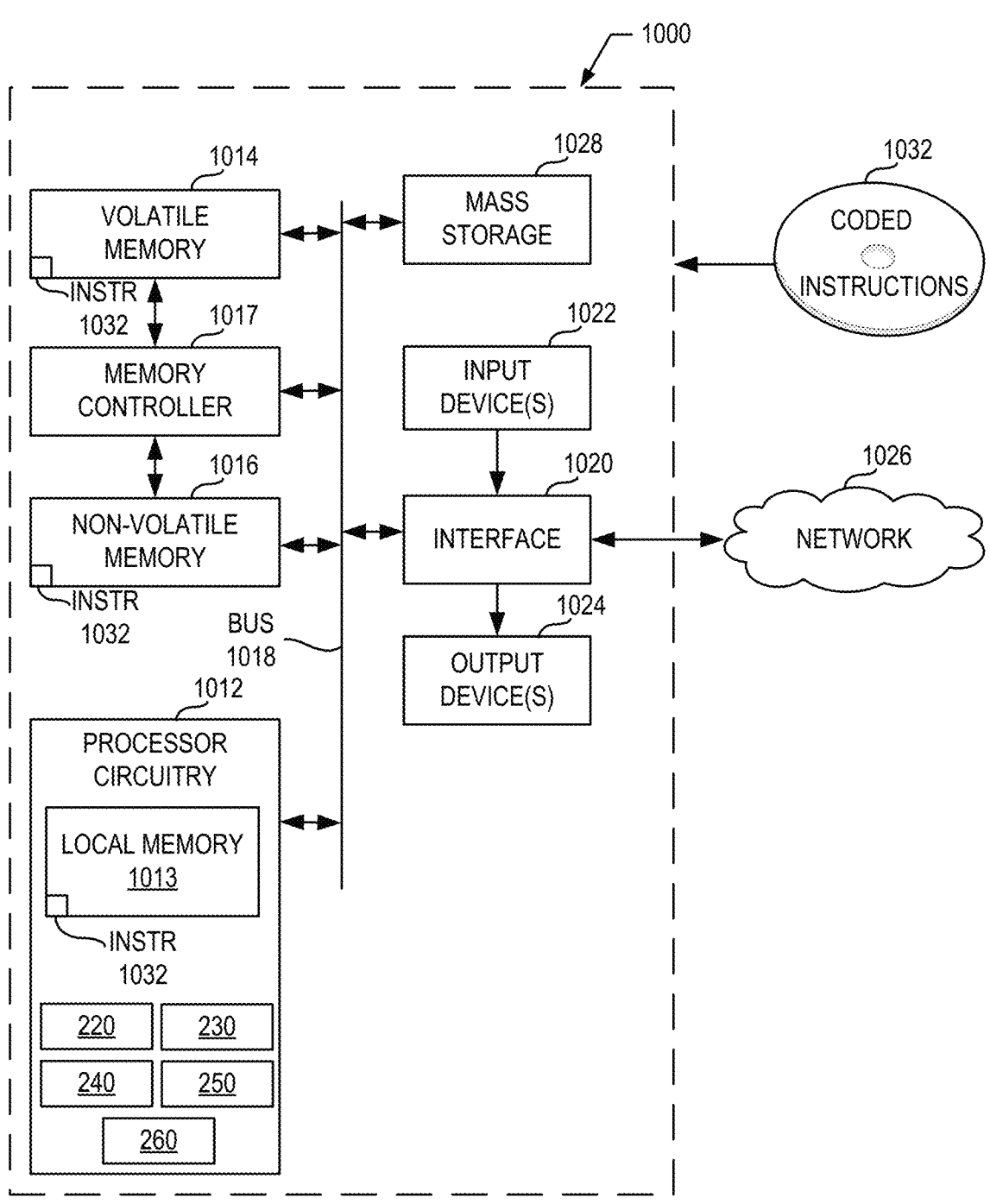
FIG. 10 is a block diagram of an example processing platform including processor circuitry structured to execute the example machine readable instructions and/or the example operations of FIGS. 4, 6, and/or 7 to implement the timing analysis circuitry of FIG. 2.

FIG. 10 is a block diagram of an example processor platform 1000 structured to execute and/or instantiate the machine readable instructions and/or the operations of FIGS. 4, 6, and/or 7 to implement the timing analysis circuitry 120 of FIG. 2. The processor platform 1000 can be, for example, a server, a personal computer, a workstation, a self-learning machine (e.g., a neural network), or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs, microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements model generation circuitry 230, feature extraction circuitry 240, model application circuitry 250, and model optimization circuitry 260

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, a keyboard, a button, a mouse, a touchscreen, a track-pad, and/or a track-ball.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.). The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1032, which may be implemented by the machine readable instructions of FIGS. 4, 6, and/or 7, may be stored in the mass storage device 1028, in the volatile memory 1014, in the non-volatile memory 1016, and/or on a removable non-transitory computer readable storage medium such as a CD or DVD.

Figure 11:
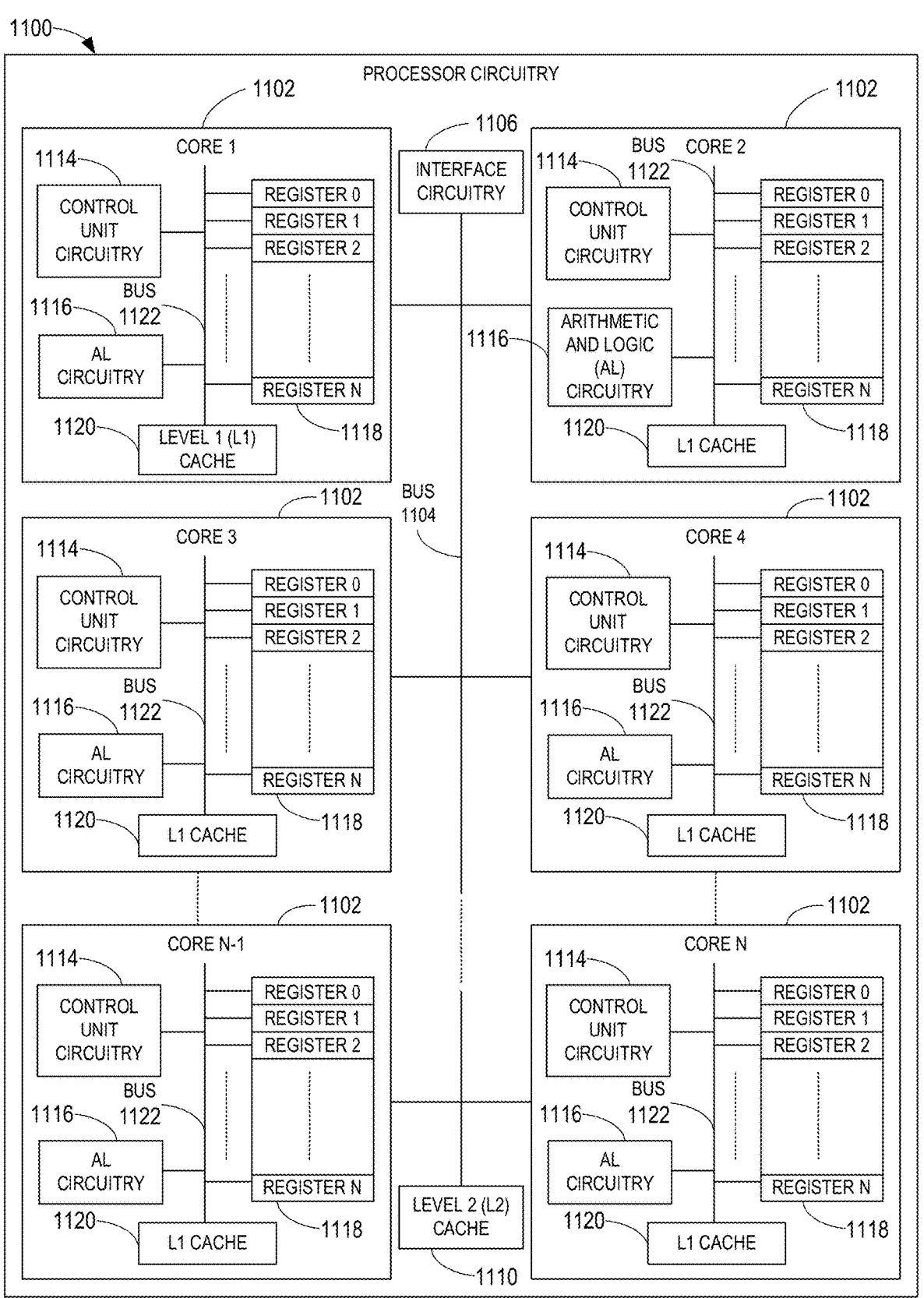
FIG. 11 is a block diagram of an example implementation of the processor circuitry of FIG. 10.

FIG. 11 is a block diagram of an example implementation of the processor circuitry 1012 of FIG. 10. In this example, the processor circuitry 1012 of FIG. 10 is implemented by a microprocessor 1100. For example, the microprocessor 1100 may be a general purpose microprocessor (e.g., general purpose microprocessor circuitry). The microprocessor 1100 executes some or all of the machine readable instructions of the flowcharts of FIGS. 4, 6, and/or 7 to effectively instantiate the timing analysis circuitry of FIG. 2 as logic circuits to perform the operations corresponding to those machine readable instructions. In some such examples, the timing analysis circuitry of FIG. 2 is instantiated by the hardware circuits of the microprocessor 1100 in combination with the instructions. For example, the microprocessor 1100 may be implemented by multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 4, 6, and/or 7.

The cores 1102 may communicate by a first example bus 1104. In some examples, the first bus 1104 may be implemented by a communication bus to effectuate communication associated with one(s) of the cores 1102. For example, the first bus 1104 may be implemented by at least one of an Inter-Integrated Circuit (I2C) bus, a Serial Peripheral Interface (SPI) bus, a PCI bus, or a PCIe bus. Additionally or alternatively, the first bus 1104 may be implemented by any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2 cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the local memory 1120, and a second example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The second bus 1122 may be implemented by at least one of an I2C bus, a SPI bus, a PCI bus, or a PCIe bus Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
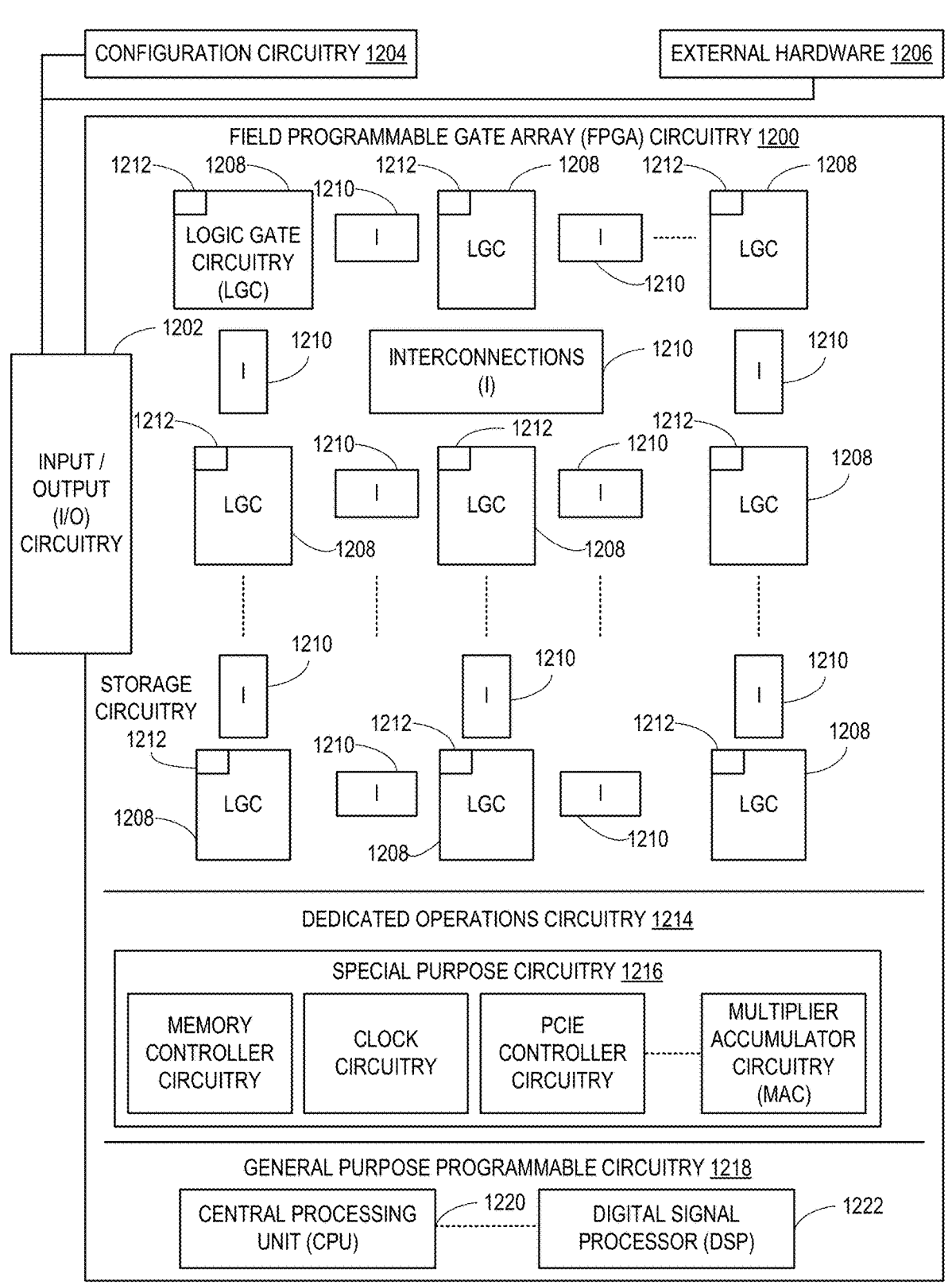
FIG. 12 is a block diagram of another example implementation of the processor circuitry of FIG. 10.

FIG. 12 is a block diagram of another example implementation of the processor circuitry 1012 of FIG. 10. In this example, the processor circuitry 1012 is implemented by FPGA circuitry 1200. For example, the FPGA circuitry 1200 may be implemented by an FPGA. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowcharts of FIGS. 4, 6, and/or 7 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowcharts of FIGS. 4, 6, and/or 7. In particular, the FPGA circuitry 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 4, 6, and/or 7. As such, the FPGA circuitry 1200 may be structured to effectively instantiate some or all of the machine readable instructions of the flowcharts of FIGS. 4, 6, and/or 7 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIGS. 4, 6, and/or 7 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware 1206. For example, the configuration circuitry 1204 may be implemented by interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may be implemented by external hardware circuitry. For example, the external hardware 1206 may be implemented by the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and the configurable interconnections 1210 are configurable to instantiate one or more operations that may correspond to at least some of the machine readable instructions of FIGS. 4, 6, and/or 7 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The configurable interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 1012 of FIG. 10, many other approaches are contemplated. For example, as mentioned above, modern FPGA circuitry may include an on-board CPU, such as one or more of the example CPU 1220 of FIG. 12. Therefore, the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowcharts of FIGS. 4, 6, and/or 7 may be executed by one or more of the cores 1102 of FIG. 11, a second portion of the machine readable instructions represented by the flowcharts of FIGS. 4, 6, and/or 7 may be executed by the FPGA circuitry 1200 of FIG. 12, and/or a third portion of the machine readable instructions represented by the flowcharts of FIGS. 4, 6, and/or 7 may be executed by an ASIC. It should be understood that some or all of the timing analysis circuitry 120 of FIG. 2 may, thus, be instantiated at the same or different times. Some or all of the circuitry may be instantiated, for example, in one or more threads executing concurrently and/or in series. Moreover, in some examples, some or all of the timing analysis circuitry of FIG. 2 may be implemented within one or more virtual machines and/or containers executing on the microprocessor.

In some examples, the processor circuitry 1012 of FIG. 10 may be in one or more packages. For example, the microprocessor 1100 of FIG. 11 and/or the FPGA circuitry 1200 of FIG. 12 may be in one or more packages. In some examples, an XPU may be implemented by the processor circuitry 1012 of FIG. 10, which may be in one or more packages. For example, the XPU may include a CPU in one package, a DSP in another package, a GPU in yet another package, and an FPGA in still yet another package.

Figure 13:
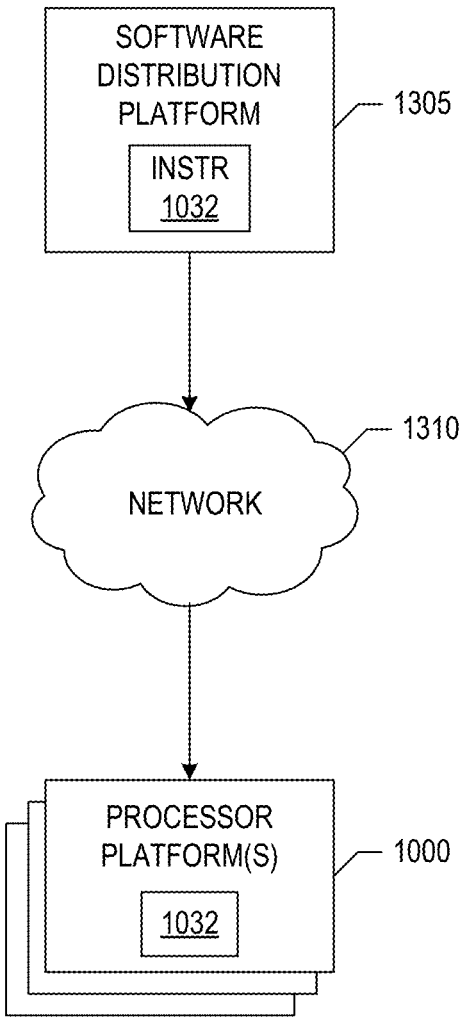
FIG. 13 is a block diagram of an example software distribution platform (e.g., one or more servers) to distribute software (e.g., software corresponding to the example machine readable instructions of FIGS. 4, 6, and/or 7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1032 of FIG. 10 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1032, which may correspond to the example machine readable instructions 400, 600, and/or 700 of FIGS. 4, 6, and/or 7, as described above. The one or more servers of the example software distribution platform 1305 are in communication with an example network 1310, which may correspond to any one or more of the Internet and/or any of the example networks 1026 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032 from the software distribution platform 1305. For example, the software, which may correspond to the example machine readable instructions 400, 600, and/or 700 of FIGS. 4, 6, and/or 7 may be downloaded to the example processor platform 1000, which is to execute the machine readable instructions 1032 to implement the timing analysis circuitry 120. In some examples, one or more servers of the software distribution platform 1305 periodically offer, transmit, and/or force updates to the software (e.g., the example machine readable instructions 1032 of FIG. 10) to ensure improvements, patches, updates, etc., are distributed and applied to the software at the end user devices.

From the foregoing, it will be appreciated that example systems, methods, apparatus, and articles of manufacture have been disclosed that reduces turnaround time on SOC design iterations. Disclosed systems, methods, apparatus, and articles of manufacture improve the efficiency of using a computing device by utilizing a machine learning model to analyze a SOC design based on learned data from a previous iteration of the SOC design. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to reduces turnaround time on SOC design iterations are disclosed herein. Further examples and combinations thereof include the following:

Example 1 includes an apparatus comprising at least one memory, machine readable instructions, and processor circuitry to at least one of instantiate or execute the machine readable instructions to extract delay features from a first system-on-chip design and a second system-on-chip design, apply a machine learning model to the extracted delay features to determine an estimated delay for the first system-on-chip design, compare the estimated delay for the first system-on-chip design to the second system-on-chip design to determine an error of the first system-on-chip design, and update the second system-on-chip design based on the error determined for the first system-on-chip design.

Example 2 includes the apparatus of example 1, wherein the processor circuitry is further to generate the machine learning model.

Example 3 includes the apparatus of example 2, wherein the processor circuitry is further to determine a learning algorithm for the machine learning model.

Example 4 includes the apparatus of example 2, wherein the processor circuitry is further to establish a timing path for the machine learning model.

Example 5 includes the apparatus of example 2, wherein the processor circuitry is further to establish a decision tree for the machine learning model.

Example 6 includes the apparatus of example 2, wherein the processor circuitry is to generate the machine learning model by using a chosen learning algorithm, a timing path, and a decision tree.

Example 7 includes the apparatus of example 1, wherein the processor circuitry is further to update the machine learning model based on the error determined of the first system-on-chip design.

Example 8 includes the apparatus of example 7, wherein the processor circuitry is further to modify a feature scale of the machine learning model.

Example 9 includes the apparatus of example 7, wherein the processor circuitry is further to modify a hyperparameter of the machine learning model.

Example 10 includes the apparatus of example 7, wherein the processor circuitry is further to remove a redundant feature from the machine learning model.

Example 11 includes the apparatus of example 7, wherein the processor circuitry is further to add a new feature to the machine learning model.

Example 12 includes the apparatus of example 1, wherein the second system-on-chip design is housed in a database.

Example 13 includes the apparatus of example 1, wherein the processor circuitry is further to output the error determined of the first system-on-chip design.

Example 14 includes a method to generate input-output timing constraints for a system-on-chip comprising extracting delay features from a first system-on-chip design and a second system-on-chip design, applying a machine learning model to the extracted delay features to determine an estimated delay for the first system-on-chip design, comparing the estimated delay for the first system-on-chip design to the second system-on-chip design to determine an error of the first system-on-chip design, and updating the second system-on-chip design based on the error determined of the first system-on-chip design.

Example 15 includes the method of example 14, further including generating the machine learning model.

Example 16 includes the method of example 15, further including determining a learning algorithm for the machine learning model.

Example 17 includes the method of example 15, further including establishing a timing path for the machine learning model.

Example 18 includes the method of example 15, further including establishing a decision tree for the machine learning model.

Example 19 includes the method of example 15, wherein the machine learning model is generated using a chosen learning algorithm, a timing path, and a decision tree.

Example 20 includes the method of example 14, further including updating the machine learning model based on the error determined of the first system-on-chip design.

Example 21 includes the method of example 20, wherein the updating of the machine learning model further includes modifying a feature scale of the machine learning model.

Example 22 includes the method of example 20, wherein the updating of the machine learning model further includes modifying a hyperparameter of the machine learning model.

Example 23 includes the method of example 20, wherein the updating of the machine learning model further includes removing a redundant feature from the machine learning model.

Example 24 includes the method of example 20, wherein the updating of the machine learning model further includes adding a new feature to the machine learning model.

Example 25 includes the method of example 14, further including outputting the error determined of the first system-on-chip design.

Example 26 includes an apparatus to generate input-output timing constraints for a system-on-chip comprising means for extracting features representative of timing delay of a first system-on-chip design and a second system-on-chip design, and means for applying a machine learning model to the extracted features to determine an error of the first system-on-chip design based on the second system-on-chip design.

Example 27 includes the apparatus of example 26, further including means for generating the machine learning model.

Example 28 includes the apparatus of example 26, further including means for optimizing the machine learning model.

Example 29 includes the apparatus of example 26, further including means for outputting a result of the machine learning model applied to the extracted features.

Example 30 includes a non-transitory machine readable storage medium comprising instructions that, when executed, cause processor circuitry to at least extract delay features from a first system-on-chip design and a second system-on-chip design, apply a machine learning model to the extracted delay features to determine an estimated delay for the first system-on-chip design, compare the estimated delay for the first system-on-chip design to the second system-on-chip design to determine an error of the first system-on-chip design, and update the second system-on-chip design based on the error determined of the first system-on-chip design.

Example 31 includes the non-transitory machine readable storage medium of example 30, wherein the instructions further cause the processor circuitry to generate the machine learning model.

Example 32 includes the non-transitory machine readable storage medium of example 31, wherein the instructions further cause the processor circuitry to determine a learning algorithm for the machine learning model.

Example 33 includes the non-transitory machine readable storage medium of example 31, wherein instructions further cause the processor circuitry to establish a timing path for the machine learning model.

Example 34 includes the non-transitory machine readable storage medium of example 31, wherein instructions further cause the processor circuitry to establish a decision tree for the machine learning model.

Example 35 includes the non-transitory machine readable storage medium of example 31, wherein the instructions further cause the processor circuitry to generate the machine learning model by using a chosen learning algorithm, a timing path, and a decision tree.

Example 36 includes the non-transitory machine readable storage medium of example 30, wherein the instructions further cause the processor circuitry to update the machine learning model based on the error determined of the first system-on-chip design.

Example 37 includes the non-transitory machine readable storage medium of example 36, wherein the instructions further cause the processor circuitry to modify a feature scale of the machine learning model.

Example 38 includes the non-transitory machine readable storage medium of example 36, wherein the instructions further cause the processor circuitry to modify a hyperparameter of the machine learning model.

Example 39 includes the non-transitory machine readable storage medium of example 36, wherein the instructions further cause the processor circuitry to remove a redundant feature from the machine learning model.

Example 40 includes the non-transitory machine readable storage medium of example 36, wherein the instructions further cause the processor circuitry to add a new feature to the machine learning model.

Example 41 includes the non-transitory machine readable storage medium of example 30, wherein the instructions further cause the processor circuitry to output the error determined of the first system-on-chip design.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
at least one memory;
machine readable instructions; and
processor circuitry to at least one of instantiate or execute the machine readable instructions to:
extract delay features from a first system-on-chip design and a second system-on-chip design;

apply a machine learning model to the extracted delay features to determine an estimated delay for the first system-on-chip design;
compare the estimated delay for the first system-on-chip design to the second system-on-chip design to determine an error of the first system-on-chip design; and
update timing constraints of the second system-on-chip design based on the error determined for the first system-on-chip design.

2. The apparatus of claim 1, wherein the processor circuitry is further to generate the machine learning model.

3. The apparatus of claim 2, wherein the processor circuitry is further to determine a learning algorithm for the machine learning model.

4. The apparatus of claim 2, wherein the processor circuitry is further to establish a timing path for the machine learning model.

5. The apparatus of claim 2, wherein the processor circuitry is further to establish a decision tree for the machine learning model.

6. The apparatus of claim 2, wherein the processor circuitry is to generate the machine learning model by using a chosen learning algorithm, a timing path, and a decision tree.

7. The apparatus of claim 1, wherein the processor circuitry is further to update the machine learning model based on the error determined of the first system-on-chip design.

8. The apparatus of claim 7, wherein the processor circuitry is further to modify a feature scale of the machine learning model.

9. The apparatus of claim 7, wherein the processor circuitry is further to modify a hyperparameter of the machine learning model.

10. The apparatus of claim 7, wherein the processor circuitry is further to remove a redundant feature from the machine learning model.

11. The apparatus of claim 7, wherein the processor circuitry is further to add a new feature to the machine learning model.

12. The apparatus of claim 1, wherein the second system-on-chip design is housed in a database.

13. The apparatus of claim 1, wherein the processor circuitry is further to output the error determined of the first system-on-chip design.

14. A method to generate input-output timing constraints for a system-on-chip comprising:
extracting delay features from a first system-on-chip design and a second system-on-chip design;
applying a machine learning model to the extracted delay features to determine an estimated delay for the first system-on-chip design;
comparing the estimated delay for the first system-on-chip design to the second system-on-chip design to determine an error of the first system-on-chip design; and
updating timing constraints of the second system-on-chip design based on the error determined for the first system-on-chip design.

15. An apparatus to generate input-output timing constraints for a system-on-chip comprising:
means for extracting features representative of timing delay of a first system-on-chip design and a second system-on-chip design;
means for applying a machine learning model to the extracted features to determine an error of the first system-on-chip design based on the second system-on-chip design; and means for updating timing constraints of the second system-on-chip design based on the error determined for the first system-on-chip design.

16. The apparatus of claim 15, further including means for generating the machine learning model.

17. The apparatus of claim 15, further including means for optimizing the machine learning model.

18. The apparatus of claim 15, further including means for outputting a result of the machine learning model applied to the extracted features.

19. A non-transitory machine readable storage medium comprising instructions that, when executed, cause processor circuitry to at least:

extract delay features from a first system-on-chip design and a second system-on-chip design;

apply a machine learning model to the extracted delay features to determine an estimated delay for the first system-on-chip design;

compare the estimated delay for the first system-on-chip design to the second system-on-chip design to determine an error of the first system-on-chip design; and update timing constraints of the second system-on-chip design based on the error determined for the first system-on-chip design.

20. The non-transitory machine readable storage medium of claim 19, wherein the instructions further cause the processor circuitry to update the machine learning model based on the error determined of the first system-on-chip design.

21. The non-transitory machine readable storage medium of claim 20, wherein the instructions further cause the processor circuitry to modify a feature scale of the machine learning model.

22. The non-transitory machine readable storage medium of claim 20, wherein the instructions further cause the processor circuitry to modify a hyperparameter of the machine learning model.

23. The non-transitory machine readable storage medium of claim 20, wherein the instructions further cause the processor circuitry to remove a redundant feature from the machine learning model.

24. The non-transitory machine readable storage medium of claim 20, wherein the instructions further cause the processor circuitry to add a new feature to the machine learning model.

25. The non-transitory machine readable storage medium of claim 19, wherein the instructions further cause the processor circuitry to output the error determined of the first system-on-chip design.

* * * * *